(12) United States Patent
Stehle et al.

(10) Patent No.: US 12,350,607 B2
(45) Date of Patent: Jul. 8, 2025

(54) FILTER DEVICE

(71) Applicant: RT-FILTERTECHNIK GMBH, Friedrichshafen (DE)

(72) Inventors: Gerhard Stehle, Constance (DE); Michael Sakraschinsky, St. Ingbert (DE); Sven Peter Wozniak, Constance (DE); Dirk Schönfeld, Apolda (DE); John Otto, Spicheren (FR); Alexander Wohlers, Saarburg (DE); Alexander Backes, Marpingen (DE); Klaus Morgens, Trier (DE); Florentin Van Uffelen, Kressbronn a.B. (DE); Marco Tassone, Saarbrücken (DE); Markus Stefan Walek, Salem (DE)

(73) Assignee: RT-FILTERTECHNIK GMBH, Friedrichshafen (DE)

( * ) Notice: Subject to any disclaimer, the term of this patent is extended or adjusted under 35 U.S.C. 154(b) by 559 days.

(21) Appl. No.: 17/628,620

(22) PCT Filed: Jul. 15, 2020

(86) PCT No.: PCT/EP2020/069965
§ 371 (c)(1),
(2) Date: Jan. 20, 2022

(87) PCT Pub. No.: WO2021/013647
PCT Pub. Date: Jan. 28, 2021

(65) Prior Publication Data
US 2022/0274036 A1 Sep. 1, 2022

(30) Foreign Application Priority Data

Jul. 25, 2019 (DE) .................... 10 2019 005 323.0
Jul. 25, 2019 (DE) .................... 10 2019 005 324.9

(Continued)

(51) Int. Cl.
*B01D 29/23* (2006.01)
*B01D 29/60* (2006.01)
(Continued)

(52) U.S. Cl.
CPC ........... *B01D 29/23* (2013.01); *B01D 29/606* (2013.01); *B01D 35/0276* (2013.01);
(Continued)

(58) Field of Classification Search
CPC ........ B01D 27/00; B01D 27/04; B01D 27/06; B01D 27/08; B01D 35/00; B01D 35/30;
(Continued)

(56) References Cited

U.S. PATENT DOCUMENTS

| 3,000,506 A | * | 9/1961 | Hultgren | .............. | B01D 35/306 |
| | | | | | 210/DIG. 17 |
| 4,320,005 A | | 3/1982 | DeGraffenreid | | |

(Continued)

FOREIGN PATENT DOCUMENTS

| DE | 2 335 276 | 2/1974 |
| DE | 198 26 032 | 12/1999 |

(Continued)

OTHER PUBLICATIONS

International Search Report (ISR) issued Sep. 28, 2020 in International (PCT) Application No. PCT/EP2020/069965.

*Primary Examiner* — Allison G Fitzsimmons
(74) *Attorney, Agent, or Firm* — Wenderoth, Lind & Ponack, L.L.P.

(57) ABSTRACT

A filter device has a filter housing (1), in which a replaceable filter element (7) is accommodated. The filter housing has a cover part (2), wherein the element material (9) of the filter element (7) extends between two end caps (13, 14) of the filter element. The filter housing (1) is formed as an outlet (Continued)

pipe (3). The element material and the outlet pipe extend between both end caps (13, 14).

15 Claims, 7 Drawing Sheets (30) Foreign Application Priority Data

Jul. 25, 2019 (DE) .................. 10 2019 005 325.7
Jul. 25, 2019 (DE) .................. 10 2019 005 326.5

(51) Int. Cl.
*B01D 35/027* (2006.01)
*B01D 35/147* (2006.01)
*B01D 35/30* (2006.01)

(52) U.S. Cl.
CPC .......... *B01D 35/147* (2013.01); *B01D 35/30* (2013.01); *B01D 2201/0423* (2013.01); *B01D 2201/291* (2013.01); *B01D 2201/295* (2013.01); *B01D 2201/304* (2013.01); *B01D 2201/305* (2013.01); *B01D 2201/309* (2013.01); *B01D 2201/4007* (2013.01); *B01D 2201/4015* (2013.01); *B01D 2201/4084* (2013.01)

(58) Field of Classification Search
CPC .... B01D 35/301; B01D 35/308; B01D 46/00; B01D 46/0002; B01D 46/0005; B01D 46/0016; B01D 2201/30; B01D 2201/301; B01D 2201/307; B01D 29/05; B01D 29/13; B01D 2201/04; B01D 2201/0407; B01D 2201/0415; B01D 2201/0423
See application file for complete search history.

(56) References Cited

U.S. PATENT DOCUMENTS

| 2005/0205484 | A1* | 9/2005 | Diel ..................... B01D 29/15 |
| | | | 210/323.1 |
| 2009/0236276 | A1* | 9/2009 | Kurth ..................... C02F 9/20 |
| | | | 210/232 |
| 2012/0312759 | A1 | 12/2012 | Ries et al. |
| 2017/0173503 | A1 | 6/2017 | Kreibig |

FOREIGN PATENT DOCUMENTS

| DE | 10 2014 007 312 | 11/2015 |
| DE | 10 2015 003 604 | 9/2016 |
| DE | 10 2016 006 833 | 12/2017 |
| DE | 10 2016 013 588 | 5/2018 |
| DE | 10 2017 011 523 | 6/2019 |
| EP | 2 201 993 | 6/2010 |
| JP | 2009-214003 | 9/2009 |
| WO | 2004/080568 | 9/2004 |
| WO | 2008/030707 | 3/2008 |
| WO | 2015/173624 | 11/2015 |

* cited by examiner

FILTER DEVICE

FIELD OF THE INVENTION

The invention relates to a filter device having a filter housing, in which a replaceable filter element is accommodated and which has a cover part, wherein the element material of the filter extends between two end caps of the latter.

BACKGROUND OF THE INVENTION

Filter devices of this type in a variety of embodiments and having replaceable filter elements that comply with different specifications are state of the art. The filter elements are used in such filtering devices for the maintenance of fluids, in particular in hydraulic systems. As shown in the document DE 10 2015 003 604 Al, which discloses a filter device of the genus mentioned above, such filter devices can advantageously be used as so-called in-tank filter devices. Starting from a wall opening of a container or tank storing the fluid, in the known solution mentioned, the filter housing having a filter head and an adjoining filter pot extends in the vertical direction into the interior of the tank. A flanging is used to secure the filter pot in the form of a relatively thin-walled circular cylinder, to the filter head. The length of the filter pot is such that the lower end of the filter housing is below the lowest fluid level, e.g. hydraulic oil, expected in the tank during operation. In filtration mode, where fluid enters the interior of the filter element from a fluid channel located at the bottom area of the tank via the lower end cap and exits the filter element as filtrate after flowing through the element material, the filter pot forms an outlet pipe having a perforation or window openings through which the filtrate passes to the interior of the tank.

SUMMARY OF THE INVENTION

Based on this state of the art, the invention addresses the problem of providing a filter device of the genus mentioned at the outset, which is characterized by a particularly simple structure that is inexpensive to manufacture.

According to the invention this problem is basically solved by a filter device having, as an essential feature of the invention, a filter housing having the form of an outlet pipe and extending between the two end caps, just like the element material. Because the outlet pipe is integrated into the filter element in this way, the entire filter housing extending from the cover part into the tank, consists only of the filter element. The filter pot, which forms the part of the filter housing located in the tank, and the outlet pipe connected to the filter head in the prior art, are eliminated in this way. Because for the integration, according to the invention, of the outlet pipe into the filter element no filter head is required, the filter device according to the invention can be manufactured in a greatly simplified structure and at correspondingly low cost. Furthermore, a particular advantage is that the outlet pipe, as an integral component of the filter element, does not form a permanent component of the filter device, but is replaced together with the filter element. As a component that does not have to be reliably functional for the entire lifetime of the filter device, the outlet pipe can therefore be made of simple and inexpensive materials in a lightweight structure.

Advantageously, the arrangement can be such that a slot-shaped annular guide is provided in each of the end caps to form a receiving for the associated end of the outlet pipe, wherein said annular guides at least partially contact wall parts at the inner and outer circumference of the outlet pipe. An adhesive may be used to secure the received ends in the slot guide.

Advantageously, the annular guide at an end cap, preferably at the end cap assigned to the cover part, can allow an axial play for the assigned end of the outlet pipe. In this way, the risk of the outlet pipe being compressed if the values of the longitudinal distance between the end caps deviate from the set value is circumvented. Therefore, no tight manufacturing tolerances have to be observed for decisive components, such as the support tube, in manufacturing the filter element. Particularly in the case of longer filter elements, for instance having a support tube composed of sub-segments, the less tight tolerances that have to be adhered render production simpler and cheaper.

In particularly advantageous exemplary embodiments, a support tube extending on the outside of the element material between the end caps, has a support structure of longitudinal spars and transverse spars that leave fluid passages open and of which at least the longitudinal spars support the element material on the inner circumference in an orientation in parallel to the longitudinal axis of the filter element and as spacers form a free space between the element material and the outlet pipe. For the guide formed in this way for the outlet pipe, the latter can be formed particularly inexpensively, for instance by a plastic sheet.

The support tube can have individual sub-segments, which can be latched together in succession using latching means, wherein the two outer sub-segments have latching means towards their free outer ends for latching to the respective assignable end cap. In that way, injection-molded support tubes can be produced from plastic for filter elements of different installation lengths without the need for separate tools for the respective installation lengths each. As shown in document DE 198 26 032 A, any desired overall installation lengths can be achieved by assembling the sub-segments in the manner of a modular system from two or more subsegments, each of which has a prefabricated installation length.

In advantageous designs, the end cap assigned to the cover part, is latched to the inside of the cover part by latching bars. The assembly work for installing the filter device in the tank is thus limited to attaching the cover part as a tank closure to the concerning tank opening.

Advantageously, the outlet pipe can be formed having one or more layers and be provided with passages. A two-layer design can improve fluid outflow characteristics, thereby fostering the degassing of air from the fluid. Various combinations of perforated sheets, fabrics or grids can be used for the layers, wherein the choice depends on the properties of the fluid in question.

In preferred exemplary embodiments, the unfiltered matter is supplied to the inside of the filter element via the lower end cap facing away from the cover part, wherein the filtrate is discharged via the outside of the filter element towards the outlet pipe.

In advantageous exemplary embodiments, in the cover part a bypass valve is integrated, which, in the open state, establishes a fluid path to the interior of the cover via an opening of the end cap assigned to the cover part, wherein the end cap has in the vicinity of its circumferential rim passages, which open out into the free space on the inside of the outlet pipe. As a result, also a volume flow that is possible when the bypass valve is opened, passes from the top side of the end cap into the free space forming the filtrate side and thus via the outlet pipe to the inside of the tank.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
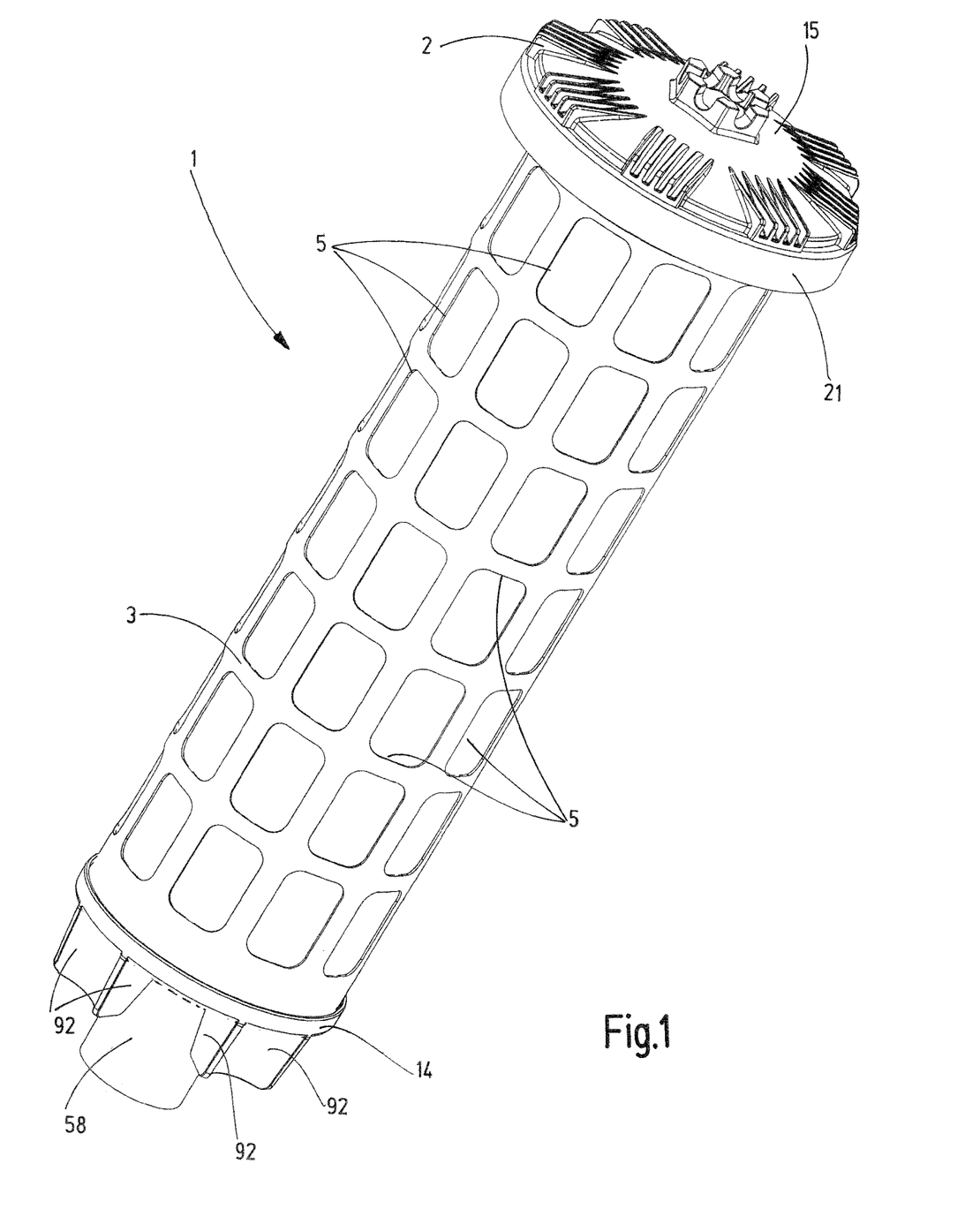
FIG. 1 is a perspective view of a filter device according to a first exemplary embodiment of the invention.
Figure 2:
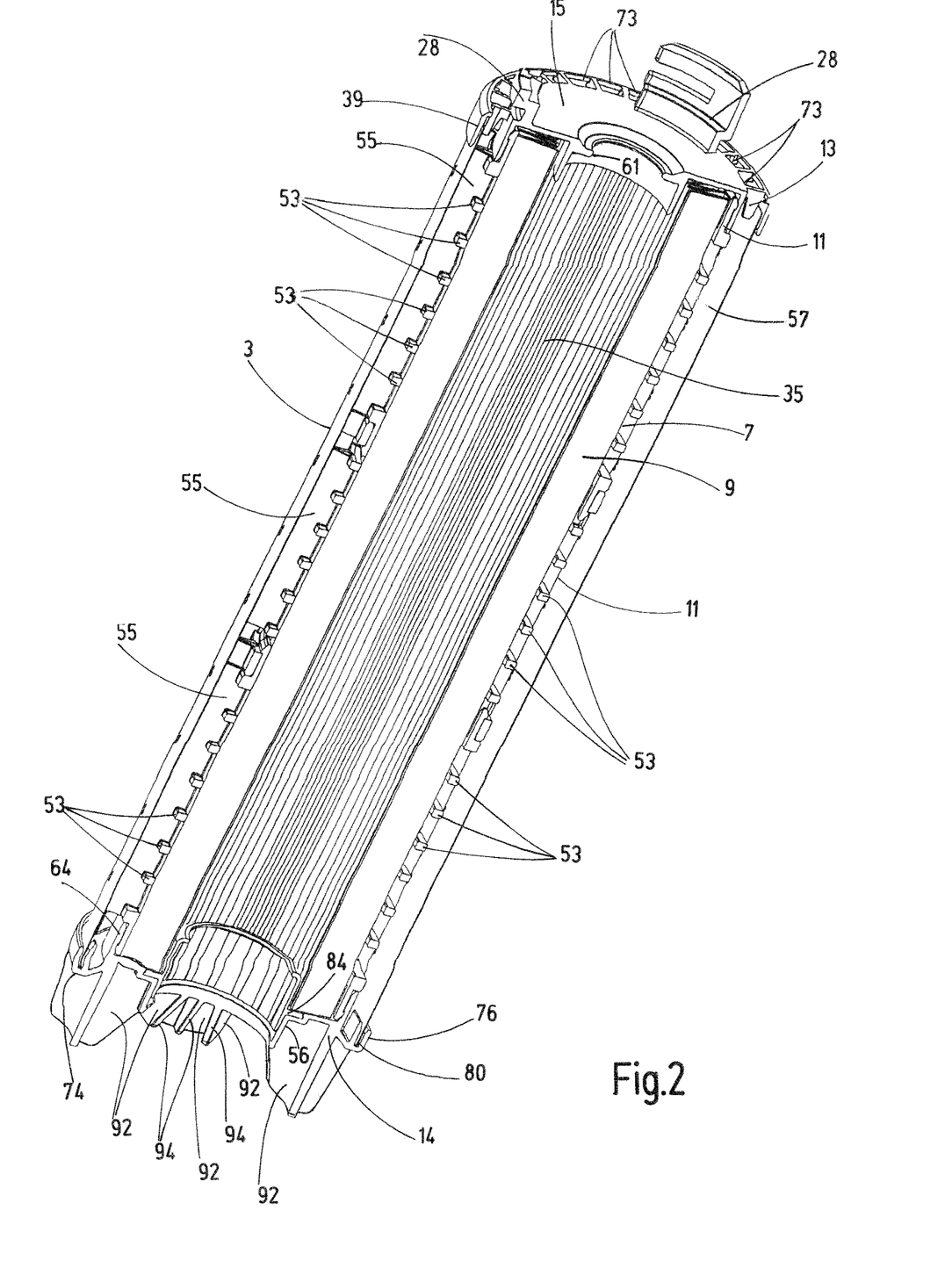
FIG. 2 is a perspective view, sectioned in a central and vertical sectional plane, of the first exemplary embodiment, wherein the cover part has been omitted.
Figure 3:
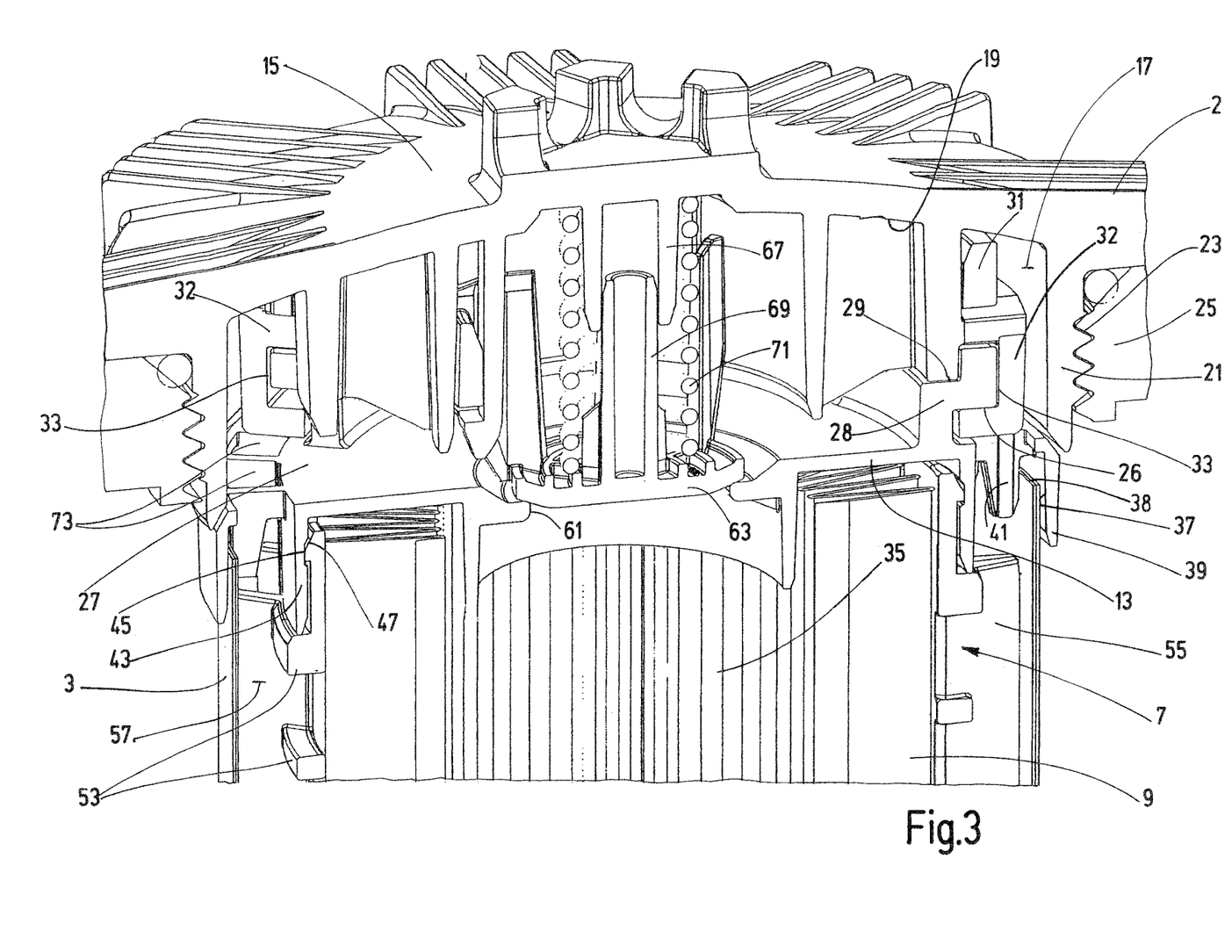
FIG. 3 is a magnified perspective view, sectioned in a vertical and central sectional plane, of only the upper end area adjacent to the cover part of the first exemplary embodiment.
Figure 4:
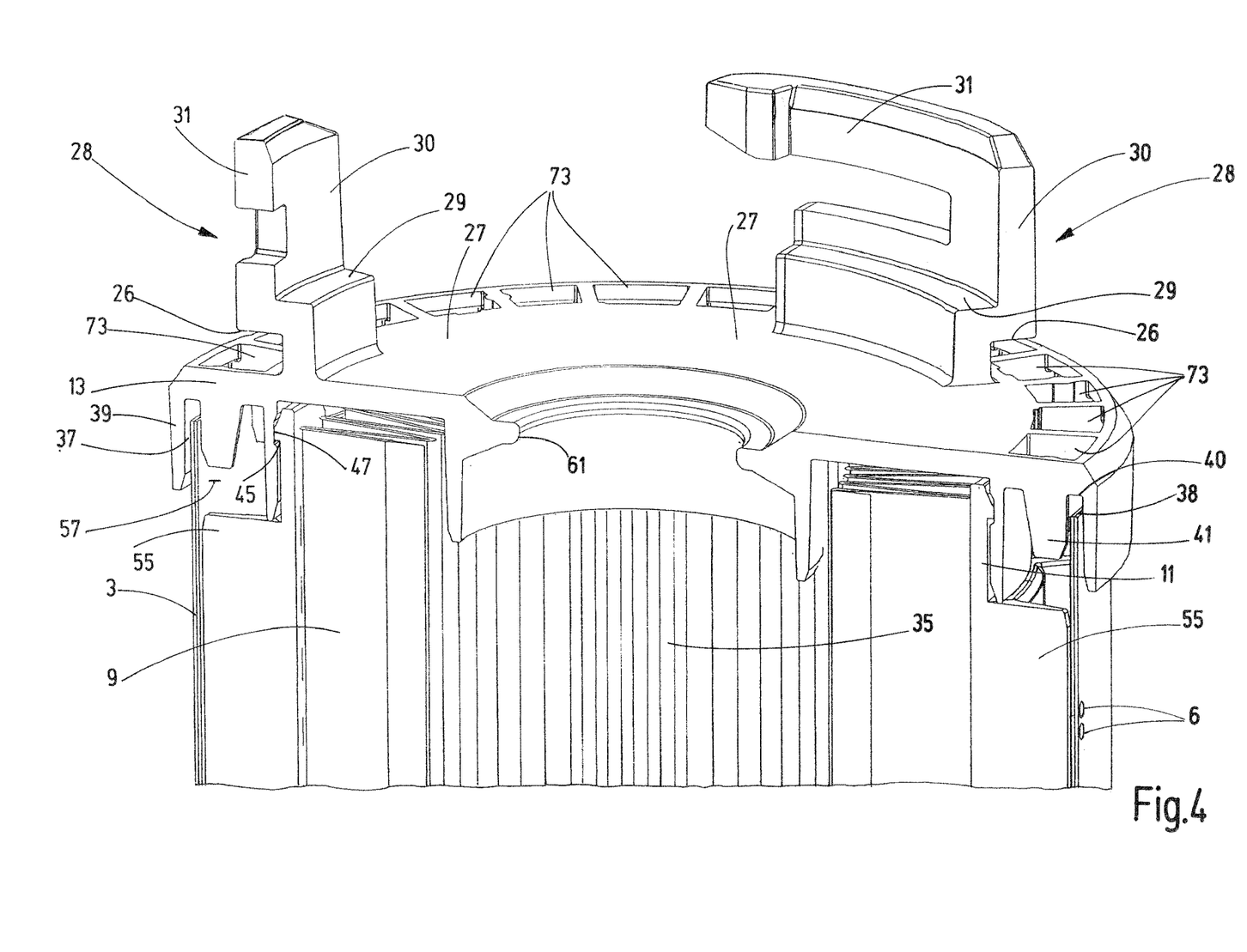
FIG. 4 is a perspective view, further magnified compared to FIG. 3 and sectioned in a vertical and central sectional plane, of only the upper end area of the filter element of a second exemplary embodiment.
Figure 6:
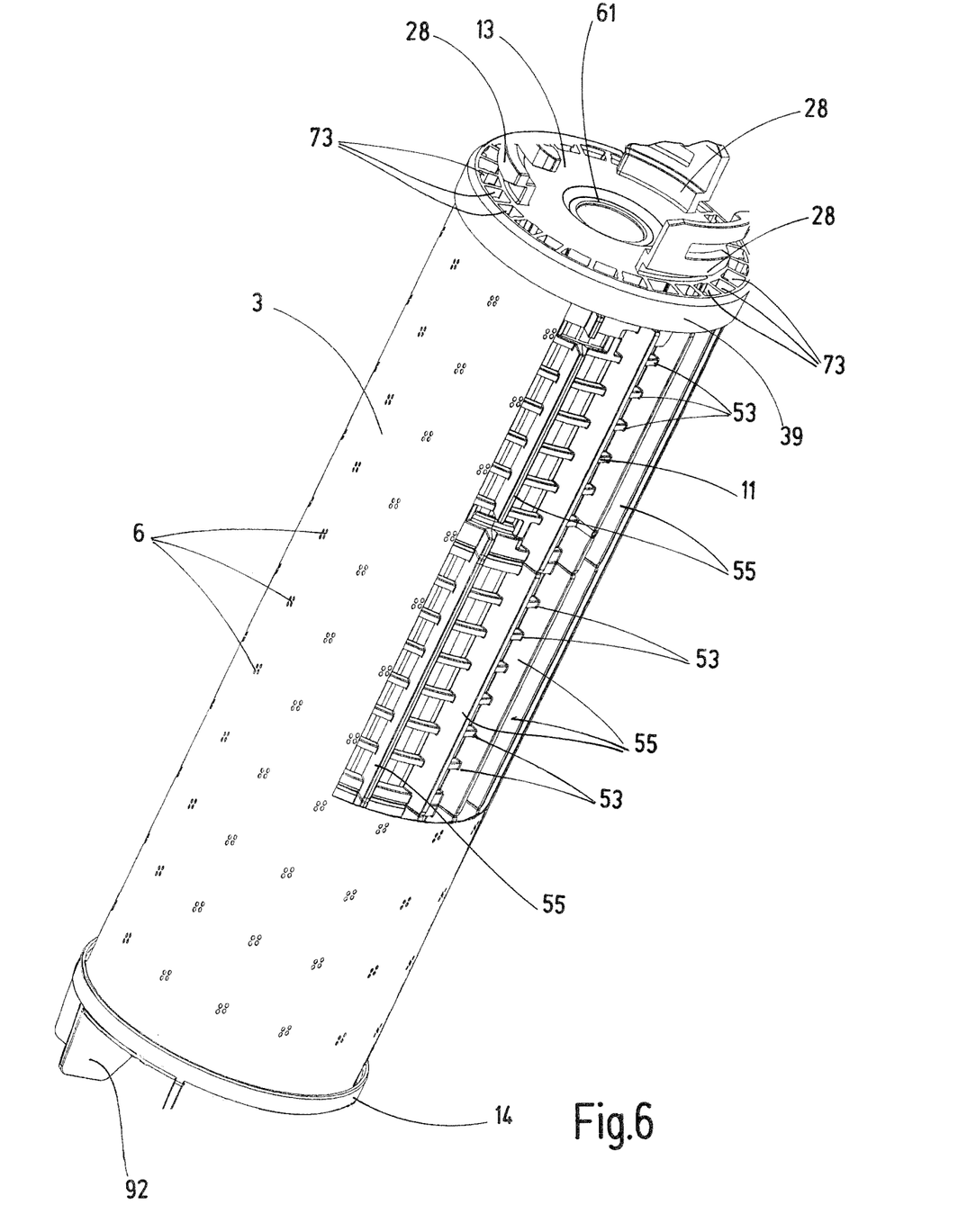
FIG. 6 is a perspective view of the filter element of the second exemplary embodiment having the outlet pipe partially sectioned.

In FIG. 1, in which an exemplary embodiment of the filter device according to the invention is shown in the form of an in-tank filter device 1 in its entirety, and has filter housing formed by a cover part 2 and an outlet pipe 3. The outlet pipe 3 has fluid passages in the form of windows 5 (only some of them numbered) or, as indicated in FIGS. 4 and 6, a perforation 6. FIGS. 2 and 6 show the part of the filter housing 1 extending from the cover part 2 (omitted in FIGS. 2 and 6) into the interior of the concerning tank (not shown) and forming a structural unit formed by the filter element 7 and by the outlet pipe 3 forming an integral part of the filter element 7. The filter element 7 has, as per usual, a hollow cylindrical element material 9 extending together with a support tube 11 between and directly contacting an upper end cap 13 and a lower end cap 14, each being a unitary, one piece member directly contacting the outlet pipe 3. The upper end cap 13 assigned and connected to the cover part 2, can be latched to the inner surface of the cover part 2, as will be discussed below in more detail with reference to FIGS. 2 to 4. As FIG. 3 shows, the cover part 2 has a slightly convex curved top face 15 and a trough-shaped interior 17, the bottom 19 of which has a concave curvature matching the curvature of the top face 15. Circumferentially, the interior space 17 is delimited by an axially projecting circular cylindrical side wall 21, which has an external thread 23, which can be used to screw the cover part 2 to a fastening flange 25 (FIG. 3) located at the tank opening of a concerning tank (not shown). The device for latching the end cap 13 to the cover part 2 has three latching bars 28 projecting upwards from the top face 27 and are arranged offset from each other by 120° near the circumference of the top face 27, wherein not all of said latching bars 28 are shown in the figures. The latching bars 28 each have the form of a circular cylinder section coaxial to the longitudinal axis of the device and are offset in the axial direction, merging into a radially outwardly offset wall part 30 via stepped surfaces 26 and 29 extending in radial planes, wherein to said wall part at the upper end an end strip 31 adjoins. As FIG. 3 shows, holding bodies 32 assigned to the latching bars 28 and connected to the bottom 19 in the interior 17 of the cover part 2 are provided. These have an inner, coaxial guide link 33, into which the latching bars 28 can be moved by a relative rotary motion between the end cap 13 and the cover part 2 in such a way that the stepped surfaces 26 and 29 lock the end cap 13 positively to the cover part 2, forming a kind of bayonet lock.

Figure 5:
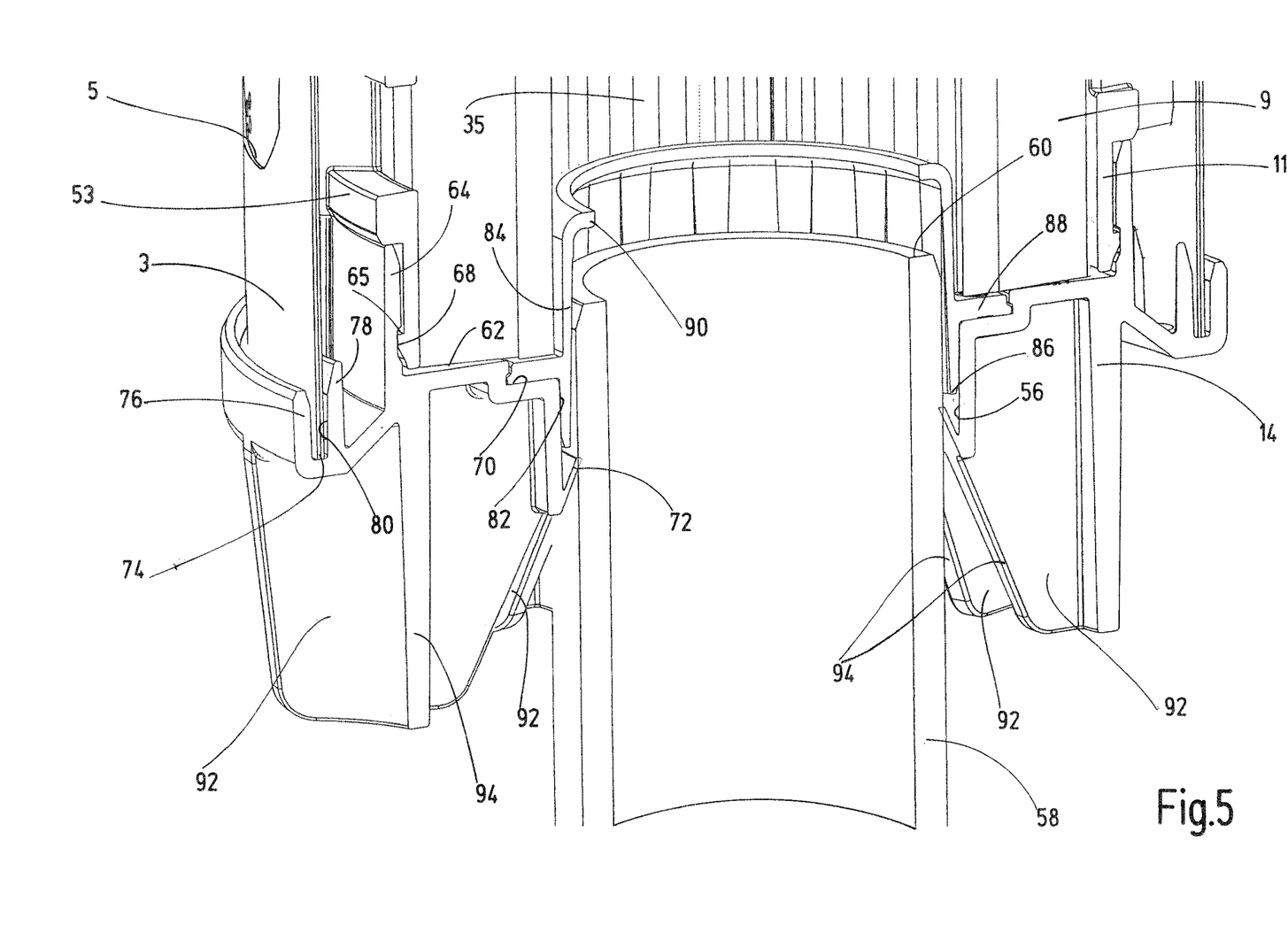
FIG. 5 is a perspective view, sectioned in a central and vertical sectional plane, of the lower end part of the filter element of the first exemplary embodiment, mounted on a fluid channel.

FIG. 5 shows the design of the lower end cap 14, through which the unfiltered matter enters the inner filter cavity 35 for filtration operation. The end cap 14 has a central opening 56 for the inflow of unfiltered matter into the inner filter cavity 35. For the supply of the unfiltered matter, a fluid channel in the form of a pipe socket 58 is provided at the bottom area of the tank (not shown), wherein said pipe socket 58 is anchored in a fixed position and in the functional position engages with the opening 56 and forms the fluid path into the filter cavity 35. As an enclosure for the facing ends of the element material 9 and the support tube 11, the lower end cap 14 has on its top face a flat contact surface 62, which is radially delimited on the outside by a peripheral rim 64 projecting axially upwards. The latter has on the inside a latching notch 65, to which a latching lug 68 of the support tube 11 can be latched, to axially secure the support tube 11 to the end cap 14. Adjoining to the peripheral rim 64 in a radially inward direction, the contact surface 62 has a planar section adjoined at the radially inner end by a step-shaped, deepened recess 70, which forms the transition to the opening 56. At the end offset axially downwards from the recess 70, of the central opening 56 the end cap 14 forms an integrally, circumferential sealing lip 72 that, in cross-section, has the shape of a thin tongue that, splayed from the wall of the opening 56, extends obliquely inwards and upwards towards the filter element 7. In accordance with the elasticity properties of the plastic material forming the end cap 32, the sealing lip 72 is elastically flexible and therefore adapts to the outside of the pipe socket 58 with sealing force. In the circumferential area adjoining the peripheral rim 64 radially outwards, the end cap 14 forms a recessed channel 74, in which between an outer peripheral rim 76 and an inner annular body 78 a slot-shaped annular space 80 is formed, in which the outlet pipe 3 is received in an inserted manner. Bonding can be used to secure the outlet pipe 3 in the annular space 80. On its underside, the end cap 14 continues downwards, adjoining to the recess 70, in a channel-shaped section 82, at the end of which the sealing lip 72 is formed. The channel section 82, in conjunction with a guide sleeve 84, forms the guide for the pipe socket 58, which extends through the opening 56 of the end cap 14 into the inner filter cavity 35 when the filter element 7 is fitted. The sleeve 84 has above its lower end 86 an annular flange 88 projecting radially outwards and is received in the opening 56 of the end cap 14 such that the annular flange 88 is fittingly arranged in the recess 70. The other upper end of the sleeve 84 has an inward crimp 90, which forms a stop body for the upper end rim 60 of the pipe socket 58, and thus an end stop limiting the insertion motion of the pipe socket 58 when the filter element 7 is inserted. To form an insertion aid when the filter element 7 is placed in position, the end cap 14 has, as a guide device adjoining the lower end of the opening 56, a ring of integrally formed, circumferentially distributed, wing-like guide ridges 92 projecting axially downwards, the radially inner rims of which form guide surfaces 94, which have a conical upward and inward course. Therefore, the guide surfaces 94 together form a type of insertion funnel, which facilitates the placement of the filter element 7 onto the pipe socket 58.

In the same way, as the annular space 80 forms a slot guide for the lower end of the outlet pipe 3 at the lower end cap 14, an annular space 37 is also formed on the upper end cap 13, between an outer peripheral rim 39 of the end cap 13 and an annular body 41 projecting axially from the underside of the end cap 13, as an annular guide, into which the upper end 38 of the outlet pipe 3 can be inserted. Radially further inward, a wall part 43 projecting coaxially downward from the bottom of the end cap 13, forms the enclosure for the upper end of the element material 9 and the upper end of the support tube 11. As with the lower end cap 14, a latching notch 45 is provided on the wall part 43 for latching the support tube 11 and a latching lug 47 is provided on the support tube 11, latching the support tube 11 to the end cap 13.

Figure 7:
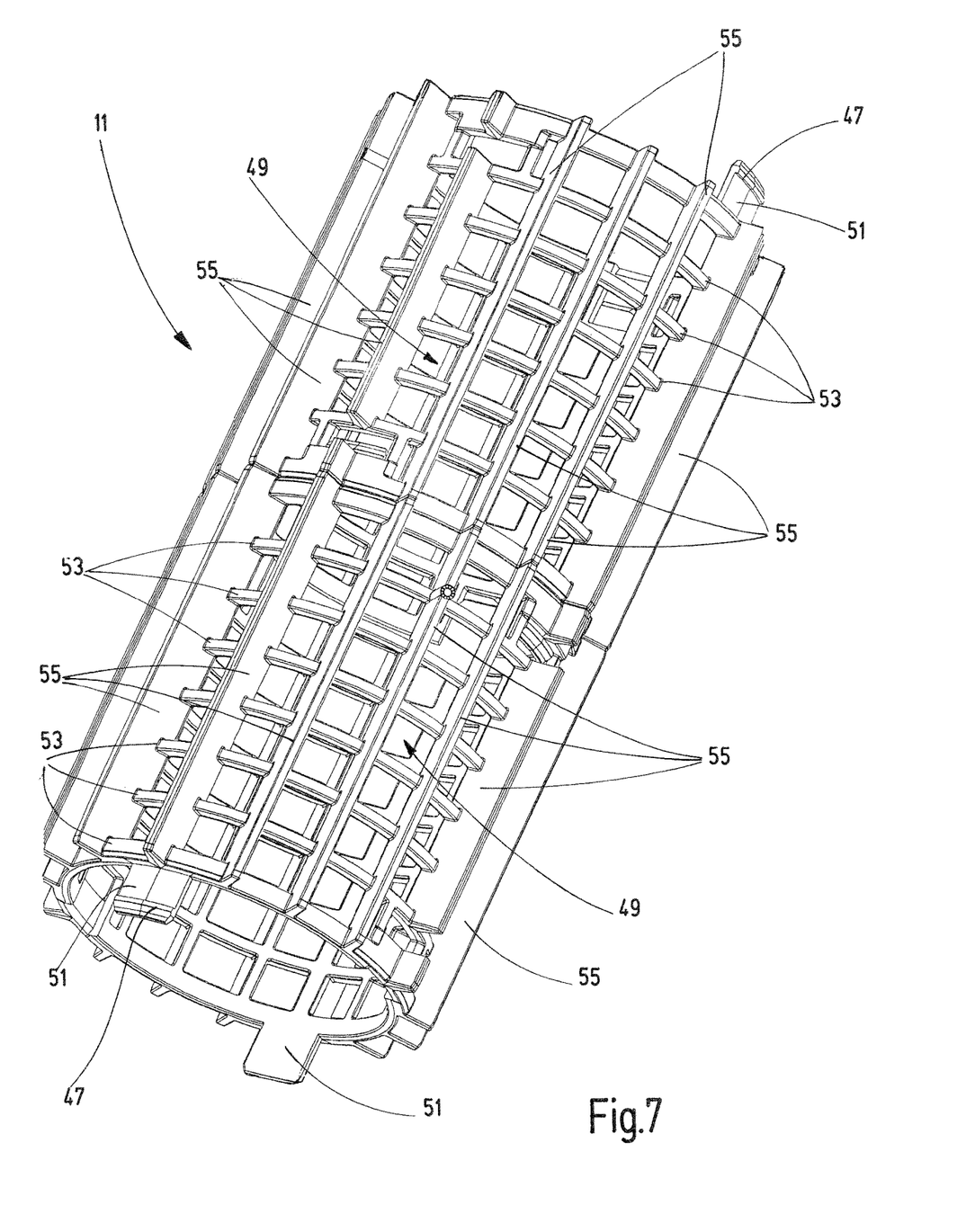
FIG. 7 is a perspective view of a longitudinal section of the support tube of a third exemplary embodiment, composed of partial segments.

As can be seen most clearly from FIGS. 6 and 7, the support tube 11 is composed as a grid-shaped support structure of three sub-segments 49, which are formed by identical parts injection-molded from plastic that can be interconnected by latching means. The respective outer sub-segments 49 to be latched to an end cap 13, 14, have two latching tongues 51 arranged diametrically opposite from each other on the outer circumference, wherein on said latching tongues 51 the latching lugs 47 projecting radially outwards are formed, by which the upper end of the support tube 11 can be latched to the end caps 13, 14, see FIGS. 3 and 4. As can be seen most clearly in FIG. 7, the grid structure is made up of ring segments 53 forming transverse spars, which extend equidistantly form each other in radial planes, and of longitudinal spars connecting the ring segments 53, wherein said longitudinal spars are formed from parallel flat strips 55 (likewise not all numbered) extending equidistantly from each other and projecting radially over the ring segments 53 in the manner of wings. The outer edges of the strips 55 form guide surfaces for the adjacent outlet pipe 3, wherein the strips 55 as spacers form a free space 57 between the element material 9 and the surrounding outlet pipe 3 owing to their radial projection over the ring segments 53. During filtration operation, when the fluid from the inner filter cavity 35 flows through the element material 9 to the outside, this free space forms the filtrate side, from which the filtrate exits via the passages of the outlet pipe 3 into the interior of the tank.

The upper end cap 13 has a central opening 61 that forms a possible passage from the filter cavity 35 to the interior 17 of the cover part 2, but is normally closed by the closing body 63 of a bypass valve located in the cover interior 17. The bypass valve has a guide sleeve 67 projecting coaxially from the bottom 19 of the cover part 2, wherein in said guide sleeve 67 a stem 69 of the closing body 63 is guided in a displaceable manner. A compression spring 71 surrounding the sleeve 67, wherein said compression spring 71 is clamped between the bottom 19 of the cover part and the disc-shaped closing body 63 of the bypass valve and preloads the latter into the closed position. As most clearly shown in FIGS. 4 and 6, the upper end cap 13 has near its peripheral rim a ring of passages 73 that form fluid paths from the top side 27 of the end cap 13 to the free space 57 below. When the bypass valve is opened by the pressure of the unfiltered matter, the unfiltered matter flowing into the interior 17 of the cover, gets through the passages 73 to the filtrate side in the free space 57 and from there enters the interior of the tank via the outlet pipe 3.

In case of the guide for the outlet pipe 3, formed by the wing-like strips 55, the outlet pipe 3 can be formed from a thin-walled material sheet, for instance in the form of a plastic sheet. With particular advantage, a multilayer design can be provided. For instance, a two-layer structure can improve the outflow behavior and promote the degassing of air from the fluid. As FIG. 4 shows, the end 38 of the outlet pipe 3 is located a short distance from the base 40 of the annular guide 37. Axial play is therefore available for the inserted end of the outlet pipe 3, such that any length deviations of the spacing between the end caps 13, 14 can be compensated and in that way any bulging of the outlet pipe 3 is prevented.

While various embodiments have been chosen to illustrate the invention, it will be understood by those skilled in the art that various changes and modifications can be made therein without departing from the scope of the invention as defined in the claims.

The invention claimed is:

1. A filter device, comprising:
  a filter housing having a cover part and being an outlet pipe with first and second axial ends;
  a replaceable filter element being accommodated in the cover part and having an element material extending between first and second end caps of the replaceable filter element, the outlet pipe only extending between the first and second end caps as well as the element material;
  first and second slot-shaped annular guides in the first and second end caps, respectively, receiving the first and second axial ends, respectively, of the outlet pipe, the first and second slot-shaped annular guides at least partially contacting wall parts on inner and outer circumferences of the outlet pipe; and
  a support tube extending on an outside of the element material between the first and second end caps,
  wherein:
  the second end cap has, on a top face thereof, a flat contact surface which is radially delimited on an outside by a peripheral rim projecting axially upwards; and
  the peripheral rim has on an inside a latching notch, to which a latching lug of the support tube is configured to be latched, to axially secure the support tube to the second end cap.

2. The filter device according to claim 1, wherein the first slot-shaped annular guide in the first end cap is configured to allow axial play for the first axial end of the outlet pipe.

3. The filter device according to claim 2, wherein the first end cap is connected to the cover part.

4. The filter device according to claim 1, wherein:
  the support tube has a support structure of longitudinal spars and transverse spars configured to leave fluid passages open, at least the longitudinal spars supporting the element material on an inner circumference thereof in an orientation in parallel to a longitudinal axis of the replaceable filter element; and
  spacers define a free space between the element material and the outlet pipe.

5. The filter device according to claim 4, wherein:
  the support tube comprises individual sub-segments connected together in succession by inner latches; and the individual sub-segments define axial ends of the support tube and have outer latches towards axial outer ends thereof being configured to latch to respective ones of the first and second end caps.

6. The filter device according to claim 3, wherein the first end cap is connected to an inside of the cover part by latching bars.

7. The filter device according to claim 1, wherein the outlet pipe has one or more layers and includes passages.

8. The filter device according to claim 3, wherein the filter device is configured to:
supply unfiltered matter to an inside of the replaceable filter element via the second end cap facing away from the cover part; and
discharge filtrate via an outside of the replaceable filter element towards the outlet pipe.

9. The filter device according to claim 1, further comprising:
a bypass valve integrated in the cover part and configured to establish a fluid path to an inside of the cover part via an opening of the first end cap coupled to the cover part in an open state of the bypass valve,
wherein the first end cap has, adjacent to a circumferential rim thereof, passages opening out into a free space on an inside of the outlet pipe.

10. The filter device according to claim 1, wherein each of the first and second end caps directly contacts the element material and the outlet pipe.

11. The filter device according to claim 1, wherein each of the first and second end caps is a unitary, one-piece member.

12. The filter device according to claim 1, wherein the flat contact surface of the second end cap directly contacts the element material.

13. A filter device, comprising:
a filter housing having a cover part and being an outlet pipe with first and second axial ends;
a replaceable filter element being accommodated in the cover part and having an element material extending between first and second end caps of the replaceable filter element, the outlet pipe only extending between the first and second end caps as well as the element material;
first and second slot-shaped annular guides in the first and second end caps, respectively, receiving the first and second axial ends, respectively, of the outlet pipe, the first and second slot-shaped annular guides at least partially contacting wall parts on inner and outer circumferences of the outlet pipe; and
a support tube extending on an outside of the element material between the first and second end caps,
wherein:
the first end cap has a wall part projecting coaxially downward from a bottom of the first end cap, the wall part defining an enclosure for an upper end of the element material and an upper end of the support tube;
a latching notch is defined on the wall part for latching the support tube to the first end cap; and
a latching lug is defined on the support tube for latching the support tube to the first end cap.

14. The filter device according to claim 1, wherein the outlet pipe is formed of a sheet having a constant outer diameter from the first end cap to the second end cap.

15. The filter device according to claim 14, wherein the outlet pipe has a multilayer structure.

* * * * *